July 13, 1971     L. L. THORNTON     3,592,755
ELECTROPAINTING APPARATUS
Filed Sept. 24, 1968     2 Sheets-Sheet 1
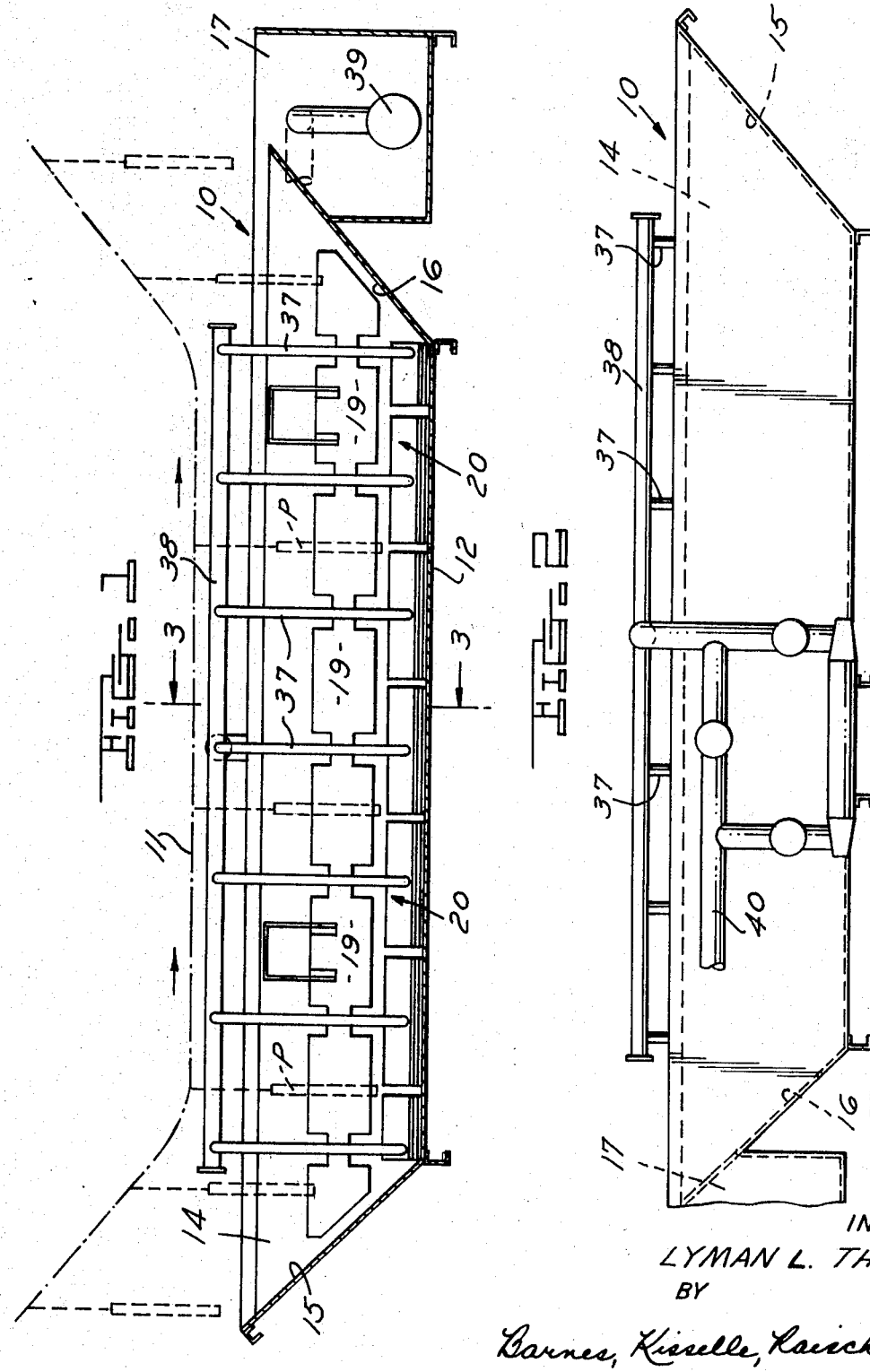
INVENTOR
LYMAN L. THORNTON
BY
Barnes, Kisselle, Raisch & Choate
ATTORNEYS

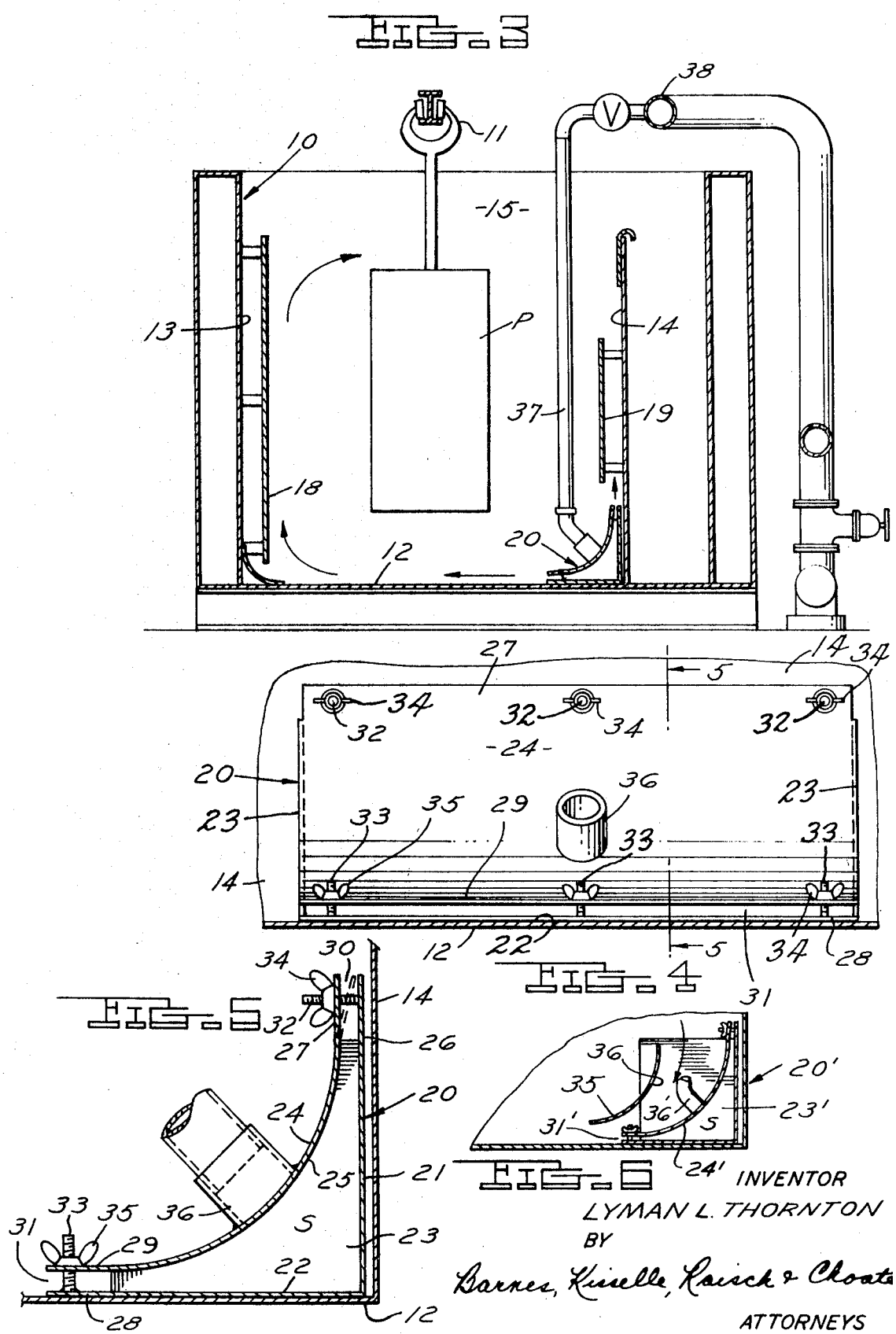

United States Patent Office 3,592,755
Patented July 13, 1971

3,592,755
ELECTROPAINTING APPARATUS
Lyman L. Thornton, Waterford, Mich., assignor to Mahon Technology Group, Inc., Sterling Heights, Mich.
Filed Sept. 24, 1968, Ser. No. 761,930
Int. Cl. B01k 3/00, 5/00
U.S. Cl. 204—299
15 Claims

ABSTRACT OF THE DISCLOSURE

An electropainting apparatus comprising a longitudinally extending tank having a side and bottom and an overflow area. Deflector assemblies are provided at longitudinally spaced points at the areas of juncture of the side and bottom walls and liquid is introduced into the assemblies and directed by the assemblies transversely of the tank to cause a transverse circulation.

This invention relates to electropainting.

BACKGROUND OF THE INVENTION

In electropainting, the parts to be coated are moved through a tank containing the paint and the paint is applied to the parts by electrodeposition commonly known as electrophoresis. One of the most difficult problems in connection with such a process is the production of a continuous circulation so that the paint will remain properly mixed and will not build up or accumulate on the projecting parts or portions of the apparatus.

Among the objects of the present invention are to provide a method and apparatus for producing a transverse circulation; which is relatively simple, easily constructed and readily applied to conventional electropainting tanks.

FIG. 1 is a side elevational view of an electropainting apparatus embodying the invention.

FIG. 2 is a side elevational view from the opposite side.

FIG. 3 is a transverse sectional view on an enlarged scale taken along the line 3—3 in FIG. 1.

FIG. 4 is a fragmentary plan view on an enlarged scale of a portion of the apparatus.

FIG. 5 is a fragmentary sectional view taken along the line 5—5 in FIG. 4.

FIG. 6 is a sectional view similar to FIG. 5 showing a modified form of the invention.

DESCRIPTION

Referring to FIGS. 1 and 2, the electropainting apparatus embodying the invention comprises a tank 10 containing paint through which the parts P (FIG. 1) to be coated are moved by a conveyor 11.

As shown in FIG. 3, the tank 10 comprises a bottom wall 12, side walls 13, 14 and tapered end walls 15, 16 the latter extending into an overflow area 17 (FIG. 2). The tank further includes electrodes 18, 19 in accordance with conventional construction. The apparatus heretofore described is conventional.

In accordance with the invention, deflector assemblies 20 are provided at longitudinally spaced points in the tank at the area of juncture of the side wall 14 and bottom wall 12.

As shown in FIGS. 4 and 5, each deflector assembly includes a vertical wall 21 and a horizontal wall 22, end walls 23 joined to the vertical wall 21 and horizontal wall 22 and a deflector wall 24 joined to the end walls 23. The deflector wall 24 is curved to form a concave surface 25 facing inwardly of the deflector. Portions 26, 27 and 28, 29 of the walls and deflector extend beyond the end walls to provide a space 30, 31. Bolts 32, 33 are fixed to the walls 21, 22 and extend through an opening in the portions 27, 29. Wing nuts 34, 35 are threaded on each bolt 32, 33. The portions 27, 29 are made of a spring material such as sheet metal so that by tightening or loosening the wing nuts 34, 35, the width of the spaces 30, 31 can be varied.

Each deflector wall 24 has a generally radial inlet 36. A pipe 37 is connected to each inlet 36 and extends vertically upwardly to a header 38. Liquid is removed from the overflow area 17 by a pump 39 and provided to the header 38 through a pipe 40.

In use, the paint removed from the overflow area is supplied to the header and flows downwardly through the pipes 37 into the space S of each deflector assembly 20 and thereafter outwardly through opening 31 generally transversely and parallel to the bottom wall 12. This flow produces a transverse circulation in the manner of the arrow shown in FIG. 3. A lesser portion of the paint is directed upwardly to space 30 along the wall 14 to prevent the accumulation or deposition of paint along this wall 14.

It has been found that the transverse circulation caused by the deflector assemblies 20 produces an effective means for circulating the paint while permitting a slow longitudinal overflow into the tank area 17.

The use of individual deflector assemblies 20 permits the addition of the circulating apparatus to tanks which have been previously fabricated. The number of deflector assemblies 20 can be adjusted by removing or adding assemblies in order to produce the desired circulation.

In the form of the invention shown in FIG. 6, the end walls 23' of the deflector assembly 20' extend beyond the deflector wall 24' and support an auxiliary deflector wall 35 in spaced relation to the space 31' and the lower outer surface of the deflector wall 24'. The auxiliary deflector 35 is made of substantially uniformly thick material and curved to provide a convex surface 36 adjacent the lower outer surface of the deflector 24' and the space 31'.

The transverse circulation of liquid caused by the deflector assembly 20' in the manner previously described produces a flow of paint between the auxiliary deflector 35 and the main deflector 24'. This flow tends to induce or aspirate a further flow or circulation of paint out of the space S thus further facilitating the transverse circulation.

I claim:
1. In an electropainting apparatus,
a tank including a side wall and bottom wall,
said tank having an overflow area to which the liquid contents of the tank flow,
means for inducing a transverse flow comprising deflector means positioned adjacent the area of juncture of the side wall and bottom wall,
said deflector means having a longitudinally extending portion spaced from the bottom of the tank,
and means for removing a portion of the liquid from the overflow area and introducing it into the space between the deflector and the tank to cause the liquid to flow through the space between the deflector and the bottom of the tank transversely of the tank and thereby cause a transverse circulation of the liquid.
2. The combination set forth in claim 1 wherein the said deflector means has a portion spaced from the side wall so that liquid flows outwardly between the upper edge of the deflector and the side.
3. The combination set forth in claim 1 wherein said means for removing overflow and introducing it into the space between the deflector and the tank comprises a pipe extending downwardly through an opening in the deflector.

4. The combination set forth in claim 3 wherein a plurality of pipes are provided at longitudinally spaced points, and a header to which said pipes are connected.

5. The combination set forth in claim 4 including a pump connected to said overflow area and to said header.

6. The combination set forth in claim 1 wherein said deflector means comprises a plurality of assemblies at longitudinally spaced points along said tank, each said assembly comprising
   a bottom wall,
   a side wall,
   end walls,
   said longitudinally extending deflector portion being spaced from said side and bottom walls by said end walls of said deflector means and having portions thereof spaced from said side and bottom walls of said deflector means.

7. The combination set forth in claim 6 including means for adjusting the space between the projecting portions of said deflector portion and said side and end walls of said deflector means.

8. The combination set forth in claim 7 wherein said last mentioned means comprises a bolt fixed to one of said walls of said deflector means and extending through the deflector portion and a nut threaded on said bolt, said projecting portions of said deflector portion being made of a flexible material.

9. The combination set forth in claim 6 including a secondary deflector portion between said end walls adjacent the outer surface of said first mentioned deflector portion for inducing the flow of liquid between the first and second mentioned deflector portions.

10. The combination set forth in claim 1 including auxiliary deflector means adjacent said first mentioned deflector means for inducing a flow of liquid therebetween.

11. For use in an electropainting apparatus comprising a tank including a side wall and bottom wall, said tank having an overflow area to which the liquid contents of the tank flow, a deflector assembly adapted to be positioned at the area of juncture of said side and bottom walls of said tank, said assembly comprising
   a bottom wall,
   a side wall,
   end walls,
   and a longitudinally extending deflector portion spaced from said side and bottom walls by said end walls and having a portion thereof spaced from said side and bottom walls.

12. The combination set forth in claim 1 including means for adjusting the space between the spaced portions of said deflector portion and said side and end walls.

13. The combination set forth in claim 12 wherein said last mentioned means comprises a bolt fixed to one of said walls and extending through the deflector portion and a nut threaded on said bolt, said projecting portions of said deflector being made of spring material.

14. The combination set forth in claim 11 including auxiliary deflector means adjacent said first mentioned deflector means for inducing a flow of liquid therebetween.

15. The combination set forth in claim 11 including a secondary deflector portion between said end walls adjacent the outer surface of said first mentioned deflector portion for inducing the flow of liquid between the first and second mentioned deflector portions.

References Cited
UNITED STATES PATENTS 3,496,082   2/1970   Ovem et al. _____ 204—181

OTHER REFERENCES

Koch II; Journal of Paint Technology, vol. 38, No. 499, August 1966, pp. 443–446.

HOWARD S. WILLIAMS, Primary Examiner

U.S. Cl. X.R.

204—279